United States Patent [19]

Winslow

[11] Patent Number: 5,399,220
[45] Date of Patent: Mar. 21, 1995

[54] COMPOSITE DISC MEDIA AND METHOD FOR MAKING SAME

[75] Inventor: John S. Winslow, Altadena, Calif.

[73] Assignee: Optical Disc Corporation, Santa Fe Springs, Calif.

[21] Appl. No.: 964,923

[22] Filed: Oct. 22, 1992

[51] Int. Cl.⁶ .................. B32B 31/00; G01D 9/00
[52] U.S. Cl. .................. 156/273.3; 156/275.5; 156/275.7; 156/291; 156/292; 346/76 L; 346/135.1; 347/264
[58] Field of Search .................. 428/34, 441, 442, 220; 156/292, 275.5, 275.7, 273.3, 299, 291; 427/208.6, 207.1, 510, 516; 346/76 L, 135.1

[56] References Cited

U.S. PATENT DOCUMENTS

| | | | |
|---|---|---|---|
| 2,531,128 | 11/1950 | Hobbs | 156/87 |
| 4,172,916 | 10/1979 | Watson | 156/275.7 |
| 4,587,152 | 5/1986 | Gleichenhagen et al. | 427/208.6 |
| 4,880,486 | 11/1989 | Maeda | 156/275.7 |
| 4,892,606 | 1/1990 | Miyazaki et al. | 156/275.7 |
| 4,910,048 | 3/1990 | Sinclair | 427/208.6 |
| 4,983,429 | 1/1991 | Takayanagi et al. | 156/292 |
| 4,990,208 | 2/1991 | Kano | 156/291 |

FOREIGN PATENT DOCUMENTS 1926643  12/1970  Germany ............... 156/87

Primary Examiner—Chester T. Barry
Attorney, Agent, or Firm—Ladas & Parry

[57] ABSTRACT

A composite disc in which a pattern of spaced glue dots is sandwiched between two disc halves. One of the disc halves is a dummy disc, and the other is a recordable optical disc. The pair of disc halves are joined together by depositing a pattern of spaced glue dots on the upper surface of one of the discs, positioning the second disc over the first, and contacting the lower surface of the second disc with the pattern of spaced glue dots. Preferably, the material of the glue dots is an ultraviolet curable contact cement, and, subsequent to the application of the pattern of dots on the dummy disc, and prior to joining the two disc halves, the glue dots are cured by being exposed to a source of ultraviolet light.

13 Claims, 1 Drawing Sheet

COMPOSITE DISC MEDIA AND METHOD FOR MAKING SAME

BACKGROUND OF THE INVENTION

1. Field of the Invention

This invention relates to the field of disc media, and more particularly to a type of disc which is constructed by assembling or joining two disc halves together to form a composite disc.

2. Brief Description of the Prior Art

Current commercial videodiscs are constructed from two disc halves joined together by an adhesive resulting in what may be termed a composite disc. There are many advantages of using two disc halves as opposed to molding a single disc. The most important advantage is that the resulting laminated disc resists warping based on its symmetry. Most recorded or recordable discs have some reflective or ablative surface on one side of the disc, and the other side of the disc serves as a window for the passage of a recording and/or reading laser beam. The metal reflecting layer in such discs acts as a moisture barrier such that the distribution of moisture throughout the disc is uneven, and this again is contributory to a possible severe warping problem. A composite construction avoids these physical problems and also allows, at least in the consumer disc field, single-sided disc halves to be recorded independently and good disc halves to be joined together with an adhesive to form a two-sided disc with higher overall yields.

To join the two disc halves together, in the past an amount of contact cement was sprayed onto one or both of the discs to be joined, and the adhesive was allowed to cure, as necessary. The two disc halves were then brought together and pressed to form the completed disc. An alternative way of joining disc halves is to provide a thin sheet of adhesive stretched out over one of the disc halves, and apply pressure to compress the two disc halves together with the sheet of adhesive therebetween.

In the normal assembly of the disc halves of recordable disc media, a sheet of adhesive is rolled onto a dummy disc, and then the dummy and the recordable disc are rolled together. In the process, air bubbles and contaminants which may have attached themselves to the adhesive sheet prior to application to the discs, may be sandwiched between the discs. These inclusions will produce bumps in the recordable surface which, if they are large enough, will no longer fall within the focus range of the lens, leaving the area unrecorded.

The basic problem with composite discs of the prior art is that, because the discs are bumpy, the focus servo cannot maintain focus on the information layer.

Although this problem has been known for several years, there has not been a great deal of interest in improving the flatness characteristics of the discs, since consumer players are able to cope with such problems quite readily. In a consumer player, it is only necessary to focus a lens of low numerical aperture (NA) and corresponding large depth of focus in order to recover the information. Because the numerical aperture of the objective lens in consumer players is lower than that of industrial recorder/players, the consumer playback-only system is less sensitive to out-of-flat surface defects.

Industrial recorder/player instruments use objective lens assemblies of high numerical aperture to produce small recorded marks at relatively low recording power. Unfortunately, high NA lenses are heavy and have a shallow depth of focus, so that maintaining focus on a bumpy disc is very difficult and requires a very high performance focus servo.

The unflatness of discs is primarily due to the trapping of air bubbles and contaminants between the disc halves as the two disc surfaces are brought together. Obviously the method of assembling disc halves should be done in a clean environment. However, even in the cleanest of environments (reducing the trapping of contaminants), trapped bubbles can cause information surface irregularities on the order of a few microns which is disastrous when considering that the track width on a recordable videodisc, for example, is on the order of 0.6 microns. These small surface bumps require the objective lens to undergo high vertical acceleration in order to maintain focus, and, as previously indicated, industrial recorders simply cannot accommodate these kinds of defects. As a result, the yield of usable discs is low, contributing to their higher costs.

It is thus clear that a composite disc and method of making the same in which the aforementioned surface defects can be eliminated would be highly desirable. The present invention provides such an improved disc.

SUMMARY OF THE INVENTION

The present invention provides a composite disc in which a pattern of spaced glue dots is sandwiched between two disc halves making up the composite disc.

In a typical application of the invention, although not limited thereto, one of the disc halves is a dummy disc, and the other is a recordable optical disc. The method for joining the pair of disc halves together comprises the steps of depositing a pattern of spaced deformable glue dots on the upper surface of one of the discs, positioning the second disc over the first, and contacting the lower surface of the second disc with the pattern of spaced glue dots.

Preferably, the material of the glue dots is an ultraviolet curable contact cement, and, subsequent to the application of the pattern of dots on the dummy disc, and prior to joining the two disc halves, the glue dots are cured by being exposed to a source of ultraviolet light.

In a preferred embodiment of the invention, the depositing of the pattern of glue dots onto the dummy disc is by way of a silk-screening process, whereby the ultraviolet curable contact cement is applied through a silk screen to the upper surface of the dummy disc to form the pattern of glue dots.

It has been found that using glue dots of about 1 mm across and spaced about 2 mm on center gives the best results. The glue dots may be arranged in a close packed or honeycomb pattern or may simply be arranged equally spaced in rows, wherein each glue dot in a row is offset from a glue dot in an adjacent row, along the length of the row, by a distance equal to one half the spacing of glue dots along the row.

By using the pattern of dots as described, the structure simply cannot trap air, and a significant reduction or elimination of information surface defects caused by trapped contaminants is realized. Obviously, there are a number of paths that a trapped air bubble can take in the maze of corridors between and around glue dots, so that any otherwise trapped air bubble will be distributed through the open paths between and around glue dots. As a result, the assembled disc halves, with the glue dots sandwiched therebetween, results in an exceptionally flat composite disc having low vertical acceleration characteristics for the objective lens used in reading the disc or recording the disc.

The object of using the glue dot structure is to form small, regular bumps of contact adhesive on the back of the dummy disc. After the contact cement is silk screened onto the disc and cured in place with an ultraviolet lamp, the discs may be stored in a clean location until needed. The final assembly is made using a plug which snugly fits the center holes in the dummy and recordable disc halves. The two discs are placed on the plug back-to-back. They adhere on contact, and the assembly can be removed as a whole and passed through a roller to insure uniform contact. Because the adhesive is silk screened onto only one of the surfaces, preferably a surface of the dummy disc, after removal of the silk screen immediately upon depositing the adhesive onto the dummy disc, the shape of each dot is rather conical, tapering upwardly from the dummy disc top surface.

When the recordable disc is assembled onto the dummy disc, and contact is made between the tops of the glue dots and the bottom surface of the recordable disc, the glue dots tend to flatten out, forming truncated conical shapes.

Employing a glue dot structure, the disc of the present invention eliminates surface defects caused by trapped air bubbles and other contaminants.

DETAILED DESCRIPTION OF THE PREFERRED EMBODIMENTS

Figure 1:
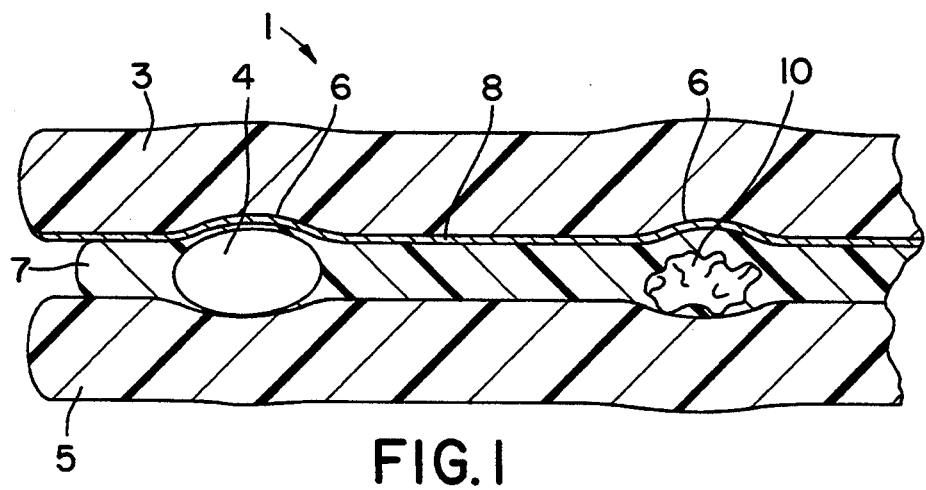
FIG. 1 is a partial cross-sectional view (not to scale) of a prior art composite disc showing the two disc halves and an adhesive sheet therebetween.

In FIG. 1, a representation of the structure of a prior art composite disc 1 is depicted. For the purposes of this description, it will be assumed that the composite disc is made up of a dummy disc and a recordable optical disc with an adhesive between the two discs. FIG. 1 best shows a recordable disc 3 and a dummy disc 5 with an adhesive sheet 7 sandwiched therebetween. An air bubble 4 and a contaminant particle 10 are shown to be trapped between the discs, resulting in an internal pressure being applied to each disc 3, 5, and producing minute but disruptive information surface bumps 6 creating the need for high vertical acceleration in the objective lens following the information track on the reflective or ablative information layer 8 of the recordable disc 3.

Figure 2:
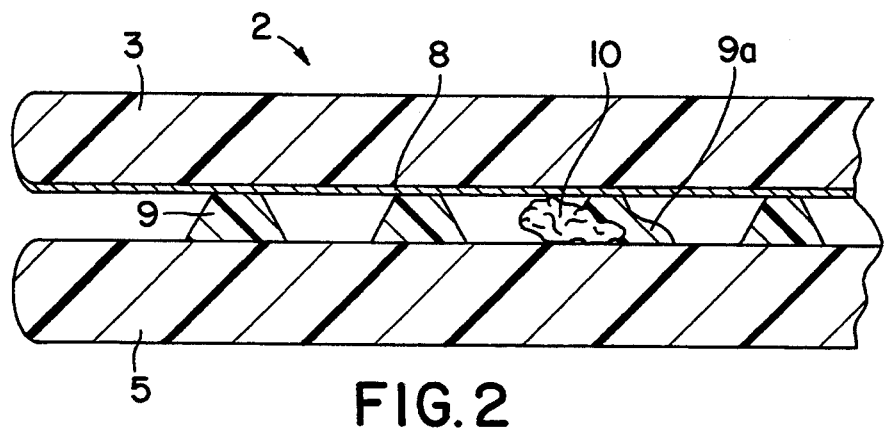
FIG. 2 is a partial cross-sectional view (not to scale) of a composite disc showing glue dots sandwiched between the two disc halves.

In FIG. 2, an arrangement of glue dots 9 is shown to join the two discs 3 and 5 together as previously described. The result is an improved composite disc 2 in which the information layer 8 is not affected by the trapping of air bubbles or other small contaminants 10, since any trapped air or minute contaminants will find their way into the spacing between glue dots. The pressure of the trapped air will obviously be dissipated throughout the available space between glue dots and to the environment, and contaminants 10 may only distort the adjacent glue dots 9a, so that the combination of the volume of the contaminant 10 and the glue dot 9 will fill some of the available space between dots and will not result in an outwardly directed force on the information layer 8 as would be the case if the contaminant was trapped in an adhesive filled region.

Figure 3:
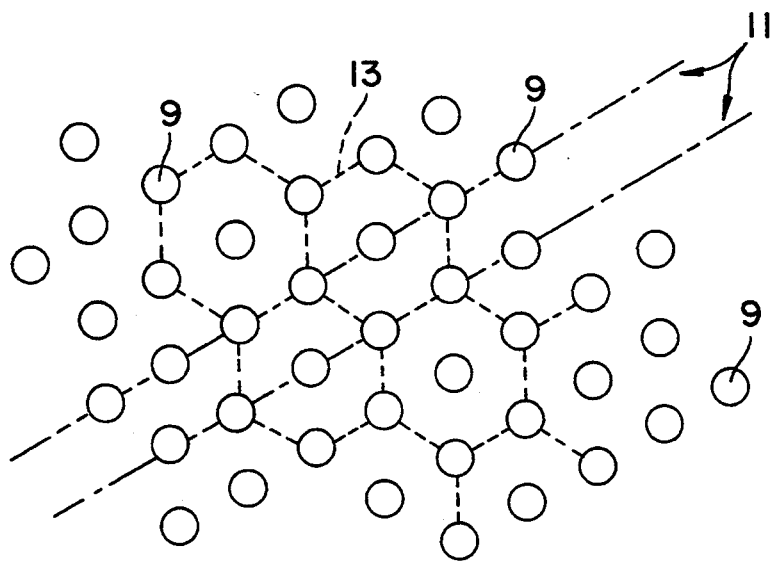
FIG. 3 illustrates the geometric pattern of adjacent rows of adhesive glue dots in accordance with the present invention.

FIG. 3 shows a preferred pattern for the glue dots. They can be described either as being placed in rows 11 with each dot in each row being offset from the dot in an adjacent row by half the spacing of the dots, 9 or, as seen by the dotted connecting lines 13 for some of the glue dots in FIG. 3, in a closed continuous honeycomb pattern.

It will be apparent that modifications of the invention may come to mind, once the basic construction and effectiveness of the inventive concepts have been understood and proven, without departing from the spirit and scope of the invention. Accordingly, the invention is not to be interpreted as being limited to the specific construction and method disclosed herein, but rather by the scope of the appended claims.

I claim:

1. A method for joining a pair of discs together, at least one of said discs being capable of containing optically readable information, said method comprising the steps of:

providing a first disc having upper and lower flat facial surfaces;

depositing a pattern of spaced glue dots over the upper surface of said first disc;

providing a second disc having upper and lower flat facial surfaces; and joining the two discs together by contacting the lower surface of said second disc with said pattern of spaced glue dots on the upper surface of said first disc, thereby producing a resulting composite disc with said first and second discs being spaced apart and with a pattern of said spaced glue dots therebetween defining open paths between and around said glue dots.

2. The method as claimed in claim 1, wherein the material of said glue dots is an ultraviolet curable contact cement, and said method includes, before said step of providing a second disc, the step of exposing said pattern of glue dots to an ultraviolet source at an exposure condition sufficient to cure said glue dots.

3. The method as claimed in claim 1, wherein said depositing step includes the step of silk screening said ultraviolet curable contact cement onto the upper surface of said first disc to form said pattern of glue dots.

4. The method as claimed in claim 1, wherein said glue dots are about 1 mm across and spaced at about 2 mm on center.

5. The method as claimed in claim 1, wherein said glue dots are arranged in a closed hexagonal pattern.

6. The method as claimed in claim 1, wherein said glue dots are arranged equally spaced and in rows, and wherein each glue dot in a row is offset from a glue dot in an adjacent row, along the length of said row, by a distance equal to one-half the spacing of glue dots along said row.

7. The method as claimed in claim 1, wherein:

said discs form a composite laser recordable optical disc;

said first disc is a dummy disc substrate; and said second disc is a recordable disc.

8. A composite optical disc comprising:

a first disc half having upper and lower flat facial surfaces;

a second disc half having upper and lower flat facial surfaces; and a pattern of spaced glue dots between the upper surface of said first disc half and the lower surface of said second disc half, said glue dots providing a space between said first and second disc halves in the resulting composite disc, with open paths between and around said glue dots.

9. The composite disc as claimed in claim 8, wherein the material of said glue dots is an ultraviolet curable contact cement.

10. The composite disc as claimed in claim 8, wherein said glue dots are about 1 mm across and spaced at about 2 mm on center.

11. The composite disc as claimed in claim 8, wherein said glue dots are arranged in a continuous honeycomb pattern over the adjoining flat facial surfaces of said disc halves.

12. The composite disc as claimed in claim 8, wherein said glue dots are arranged equally spaced and in rows, and wherein each glue dot in a row is offset from a glue dot in an adjacent row, along the length of said row, by a distance equal to one-half the spacing of glue dots along said row.

13. The composite disc as claimed in claim 8, wherein: said first disc is a dummy disc substrate; and said second disc is a laser recordable optical disc.

* * * * *